(12) United States Patent
Schindlbeck et al.

(10) Patent No.: US 12,286,368 B2
(45) Date of Patent: Apr. 29, 2025

(54) MULTI-FUNCTIONAL LEAD ANTI-DISSOLUTION COMPOSITIONS

(71) Applicant: Ticklish Turkeys LLC, Grosse Pointe Park, MI (US)

(72) Inventors: Cayden John Schindlbeck, Grosse Pointe Park, MI (US); Benjamin Silverman Bryan, Grosse Pointe Park, MI (US); Alyssa Tiān Lì Flores, Grosse Pointe Park, MI (US); Matthew Michael Jakubowski, Grosse Pointe Park, MI (US); Dailey Alexandrea Jogan, Grosse Pointe Park, MI (US); Malvina Renata Lubanski, Grosse Pointe Woods, MI (US); Liam Hendrix Raether, Grosse Pointe Park, MI (US)

(73) Assignee: Ticklish Turkeys LLC, Grosse Pointe Park, MI (US)

( * ) Notice: Subject to any disclaimer, the term of this patent is extended or adjusted under 35 U.S.C. 154(b) by 593 days.

(21) Appl. No.: 17/154,606

(22) Filed: Jan. 21, 2021

(65) Prior Publication Data

US 2021/0269334 A1 Sep. 2, 2021

Related U.S. Application Data

(62) Division of application No. 16/803,174, filed on Feb. 27, 2020, now Pat. No. 10,919,789.

(51) Int. Cl.
*C02F 1/68* (2023.01)
*C02F 101/20* (2006.01)

(52) U.S. Cl.
CPC ............ *C02F 1/68* (2013.01); *C02F 2101/20* (2013.01)

(58) Field of Classification Search
CPC ........................................................ C02F 1/68
See application file for complete search history.

(56) References Cited

U.S. PATENT DOCUMENTS

| | | | | |
|---|---|---|---|---|
| 4,460,615 A | * | 7/1984 | Furukawa | A23J 3/08 |
| | | | | 530/410 |
| 5,076,941 A | | 12/1991 | Boffardi et al. | |
| 5,232,629 A | | 8/1993 | Boffardi | |
| 6,200,529 B1 | | 3/2001 | Riggs, Jr. | |
| 10,011,508 B2 | | 7/2018 | Aulick et al. | |
| 2005/0074489 A1 | * | 4/2005 | Gonzales | A61K 9/0007 |
| | | | | 424/466 |
| 2017/0313961 A1 | | 11/2017 | Swayne et al. | |

* cited by examiner

*Primary Examiner* — Peter F Godenschwager
(74) *Attorney, Agent, or Firm* — Brooks Kushman P.C.

(57) ABSTRACT

A multi-functional lead anti-dissolution composition based on 100 parts by weight consisting of: a succinic acid in an amount of from 30 to 70 percent by weight; and a tartaric acid in an amount of from 70 to 30 percent by weight. The composition does not include any phosphates, thereby not contributing to the phosphate footprint in the water supply. The composition includes organic acids that have anti-inflammatory properties in addition to reducing lead dissolution in drinking water.

8 Claims, 3 Drawing Sheets

MULTI-FUNCTIONAL LEAD ANTI-DISSOLUTION COMPOSITIONS

CROSS-REFERENCE TO RELATED APPLICATIONS

This application is a division of U.S. application Ser. No. 16/803,174 filed Feb. 27, 2020, and issued as U.S. Pat. No. 10,919,789 on Feb. 16, 2021, the disclosure of which is hereby incorporated in its entirety by reference herein.

TECHNICAL FIELD

The present disclosure relates to multi-functional lead anti-dissolution compositions tailored for reducing the amount of lead in drinking water supplies.

BACKGROUND

Drinking water has been delivered to human beings for consumption through pipes for hundreds of years. Early drinking water pipes were formed of wooden slats lashed together with metal coils. These wooden pipes were prone to leakage and would burst under high pressure conditions. To solve this problem, wooden pipes were replaced with pipes formed from lead or pipes joined by lead solder.

However, pipes formed of or having lead may present pronounced health concerns. Lead atoms from the pipes may chemically react to become lead ions that are soluble in water. The lead ions are then carried by the current formed by the water supply to end points (e.g. water faucets) in the water supply distribution system where humans consume the water.

Lead is a toxic metal that can be harmful to human health even at low exposure levels. In children, lead may cause behavior and learning problems, lower IQ and hyperactivity, slowed growth, hearing problems and anemia. In pregnant women, lead can cause reduced growth of the fetus and premature birth. Lead is harmful to adults too. Adults exposed to lead can suffer from cardiovascular effects, increased blood pressure and incidence of hypertension, decreased kidney function and reproductive problems in both men and women.

While resources have been dedicated to finding solutions to lead dissolution in drinking water, there remains a need to discover better compositions to address this problem.

SUMMARY

In one embodiment, a multi-functional lead anti-dissolution composition based on 100 parts by weight is disclosed. The multi-functional lead anti-dissolution composition consists of a succinic acid in an amount of from 30 to 70 percent by weight; and a tartaric acid in an amount of from 70 to 30 percent by weight. The composition does not include any phosphates, thereby not contributing to the phosphate footprint in the water supply. The composition includes organic acids that have anti-inflammatory properties in addition to reducing lead dissolution in drinking water.

In another embodiment, a multi-functional lead anti-dissolution composition is disclosed. The composition includes a first organic acid, a second organic acid and a third organic acid. The first organic acid is selected from the group consisting of: a succinic acid, a tartaric acid and a citric acid. The second organic acid is selected from the group consisting of: a succinic acid, a tartaric acid and a citric acid. The first organic acid is different than the second organic acid. The third organic acid is selected from the group consisting of: a lactic acid, a phytic acid, a mandelic acid, and a glycolic acid.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "about" may be used herein to describe disclosed or claimed embodiments. The term "about" may modify a value disclosed or claimed in the present disclosure. In such instances, "about" may signify that the value it modifies is within #0%, 0.1%, 0.5%, 1%, 2%, 3%, 4%, 5% or 10% of the value.

Lead dissolution into drinking water occurs when lead metal atoms in pipes chemically react to form lead ions that are soluble in water. The chemical reaction associated with this ionization of lead is a redox reaction. The full redox reaction requires two half reactions to occur for the lead metal atoms to be converted into lead ions. The two half reactions are oxidation and reduction. The oxidation half reaction occurs in the presence of a reducing agent. The reduction half reaction occurs in the presence of an oxidizing agent. Reducing agents lose electrons ($e^-$) and are oxidized. Oxidizing agents gain electrons ($e^-$) and are reduced. An example of an oxidizing agent is hypochlorous acid (HOCl). Chlorine may be added to potable drinking water systems to disinfect the water. Chlorine and water react to form hypochlorous acid. As shown in the full and half reactions below, hypochlorous acid is reduced by gaining electrons, and in so doing, lead atoms (Pb) are oxidized to convert them into lead ions ($Pb^{2+}$).

$$\text{Full reaction: } Pb + HOCl + H^+ \rightarrow Pb^{2+} + Cl^- + H_2O \quad (1)$$

$$\text{Oxidation half-reaction: } Pb \rightarrow Pb^{2+} + 2e^- \quad (2)$$

$$\text{Reduction half-reaction: } HOCl + 2e^- + H^+ \rightarrow Cl^- + H_2O \quad (3)$$

Figure 1:
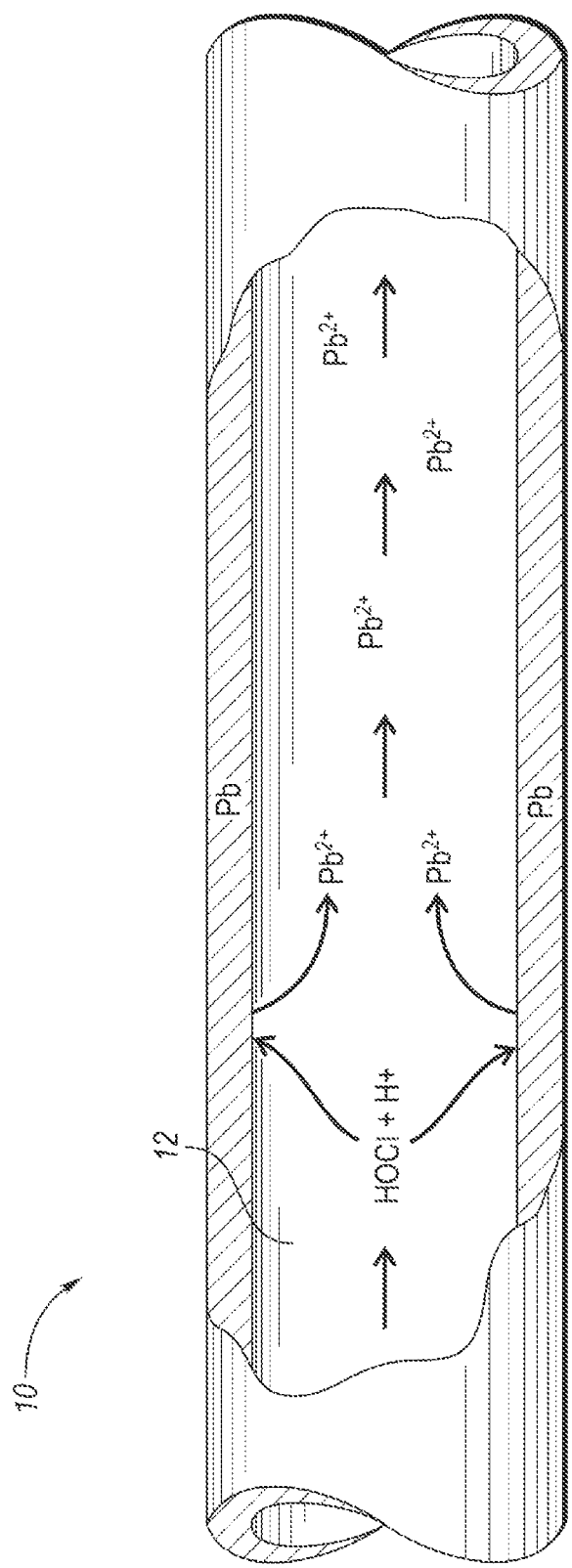
FIG. 1 is a schematic of a lead pipe showing the reaction mechanism that oxidizes lead atoms (Pb) into lead ions ($Pb^{2+}$).

FIG. 1 is a schematic of lead pipe 10 showing the reaction mechanism that oxidizes lead atoms (Pb) into lead ions ($Pb^{2+}$). Drinking water 12 flows through lead pipe 10 from left to right as signified by the arrows shown on FIG. 1. As shown by the curved arrows, the hypochlorous acid (HOCl), in the presence of hydrogen cations ($H^+$), oxidizes lead atoms (Pb) into lead ions ($Pb^{2+}$). These lead ions ($Pb^{2-}$) are entrained in the drinking water flow and may eventually be consumed by human beings, at a potential detriment to their health.

Disrupting this lead redox reaction reduces the amount of lead flowing through drinking water to be consumed by human beings. Many proposals have been advanced to disrupt this lead redox reaction. Some proposals attempt to control pH or alkalinity to reduce lead corrosion. Another line of proposals concentrates on creating a protective film or coating over the inner surface of the lead pipes. The protective film or coating inhibits the lead redox reaction by creating a physical barrier between oxidizing agents present in drinking water and the lead atoms in the pipes. While these protective film or coatings are helpful with smooth lead surfaces, they may be more difficult to implement with appropriate coverage on irregular surfaces, such as those present in lead solders to join two pipes together and older lead pipes.

Yet another line of proposals disrupts the lead redox reaction by replacing it with a different reaction that does not oxidize the lead into lead ions.

One proposal uses monofluorophosphate salts (e.g. sodium monofluorophosphate ($Na_2PO_3F$)). The monofluorophosphate salts are added to potable water sources in concentrations between 0.1 mg/L and 500 mg/L. This proposal touts a double benefit of reducing lead solubility in drinking water while adding fluoride to reduce tooth decay. However, this proposal uses a significant amount of phosphates. As described below, the use of phosphates presents issues to the environment. Also, this proposal does not mention the use of organic acids to reduce lead solubility.

Another proposal identifies an aqueous solution of stannous halide (e.g. stannous chloride) as a corrosion inhibitor suitable for use in municipal drinking water systems. The proposal suggests that aqueous stannous chloride is more effective when used without phosphates. While this proposal suggests an alternative to phosphates, the alternative is not without other concerns. When stannous chloride is mixed with water, fumes are released that may be corrosive and irritating to the eyes. Also, studies link stannous chloride to causing cancer. For these reasons, stannous chloride is not a viable alternative to the use of phosphates to reduce lead solubility.

Yet another proposal discloses a water treatment composition comprising blended phosphates to reduce lead corrosion in potable water sources. The blend includes sodium hexametaphosphate ($(NaPO_3)_6$), sodium tripolyphosphate ($Na_5O(PO_3)_3$) and monosodium phosphate ($NaH_2PO_4$). The proposal prefers a relatively low dose of citric acid (11% by weight prior to dilution with water) in the blended phosphate composition. The citric acid acts as a reducing agent to reduce lead dissolution. This proposal also gives passing mention of tartaric and oxalic acids. The proposal mentions that the citric acid level may be increased, and the blended phosphate level can be decreased. However, the only example given is citric acid at 11% by weight. Therefore, this proposal is limited in its application of citric acid as a reducing agent to reduce the amount of effective phosphates in a water treatment composition.

As more and more has been learned about the deleterious effects of lead on the health of human beings, the United States (U.S.) government has enacted stricter and stricter drinking water standards relating to lead concentrations. In 2000, the Environmental Protection Agency (EPA) promulgated the EPA lead rule with action levels for lead of 15 parts per billion (ppb) in more than 10% of customer taps sampled. An action level is the level for enforcement against a municipality or private concerns for exceeding the action levels. However, the maximum contaminant level goal (MCLG) is zero. Accordingly, there is always room for improvement.

As stated above, phosphates have been used to mitigate the lead redox reaction. However, phosphates may create environment issues. The natural background levels of total phosphorus are typically less than 0.03 mg/L. The natural levels of phosphate usually range from 0.005 to 0.05 mg/L. The natural level of phosphate may be increased using significant phosphates to treat potable water to reduce lead contamination. The lead reducing phosphates may be released into rivers and lakes. Phosphates are a great plant nutrient, especially for algae. Algae are a group of aquatic plants that include seaweed. With enough phosphates and other nutrients, algae can grow rapidly into algae blooms. Algae blooms are particularly pronounced under the right conditions (e.g. warm water temperature) in the Western Basin of Lake Erie. The algae blooms may release toxins that can kill fish. The blooms may also release a foul-smelling odor. Reducing phosphate concentration can reduce the likelihood of algae blooms forming.

Considering the foregoing, what is needed are potable water treatment compositions that significantly reduce lead corrosion while reducing or even eliminating phosphates used in the composition. What is also needed are other compounds to replace the phosphates that have other benefits, such as health benefits. The compositions disclosed herein achieve these multifunctional goals of reducing phosphate use significantly while maintaining reduced lead dissolution and introducing other health benefits.

Figure 2:
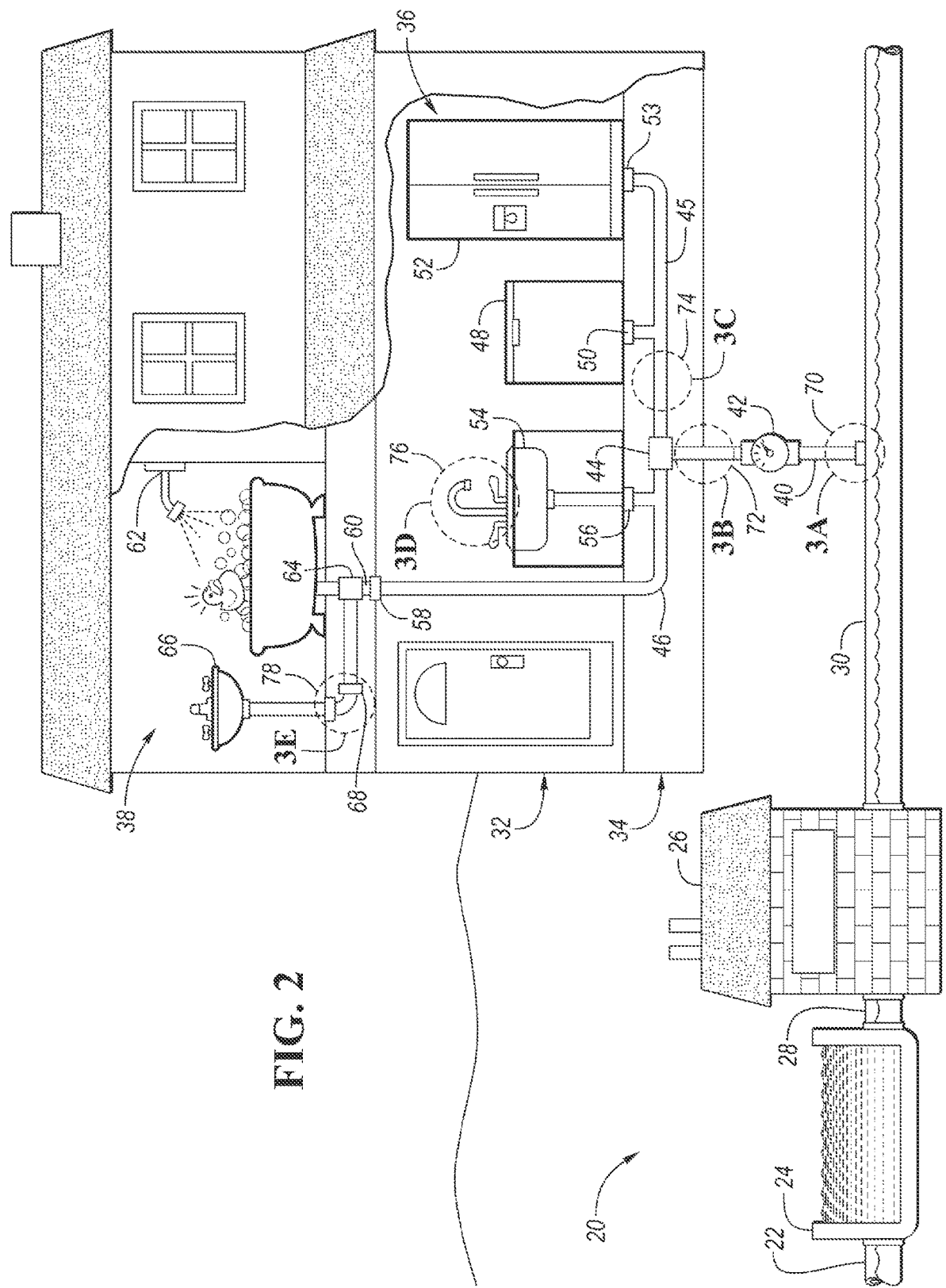
FIG. 2 depicts a schematic of a potable water delivery system.

FIG. 2 depicts a schematic of potable water distribution system 20. Water enters the potable water distribution system 20 through intake 22. For instance, in the Metro Detroit area, water from the Detroit River is taken through the Belle Isle intake. Intake 22 feeds the water to basin 24 configured to store a relatively large amount of water. Belle Isle has a basin for storing water taken from the Detroit River. Water stored in basin 24 is pumped into water treatment plant 26 through conduit 28. The water taken from the Detroit River is treated at the Northeast and the Springwells treatment plants. In water treatment plant 26, the water is treated to remove contaminants and to reduce the likelihood of lead leaching into the water supply. One or more compositions of the present disclosure may be added to the water at water treatment plant 26 to reduce the likelihood of lead leaching. After the water is treated in water treatment plant 26, it is pumped into main water line 30. Main water line 30 is configured to deliver water to domiciles, such as house 32.

House 32 includes basement 34, kitchen 36 and bathroom 38. Water from main water line 30 is directed through water service line 40 into house 32. Water service line 40 includes water meter 42 configured to measure the pressure of the water flowing through water service line 40. Main water splitter 44 splits the water flowing from water service line 40 into water pipes 45 and 46 situated in basement 34 of house 32. Water pipe 45 is configured to deliver water to dishwasher 48 through fitting 50 and to refrigerator 52 though fitting 53. Water pipe 46 is configured to deliver water to sink 54 through fitting 56 and to bathroom 38 through fitting 58. Fitting 58 is connected to water pipe 60, which delivers water to shower 62 through fitting 64 and to sink 66 through fitting 68.

Figure 3B:
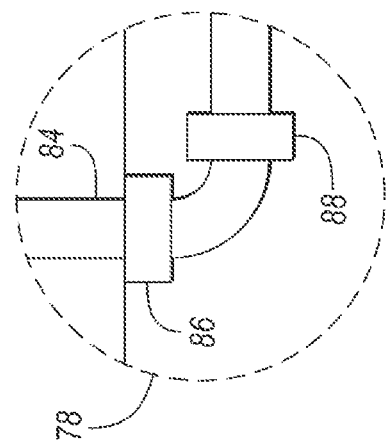
FIGS. 3A through 3E depict magnified, isolated views of regions of a potable water delivery system that may contribute to elevated lead concentrations.
Figure 3A:
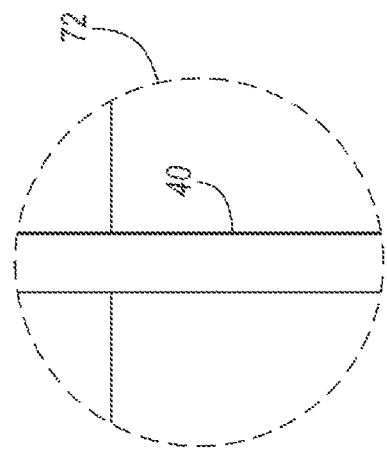
Figure 3D:
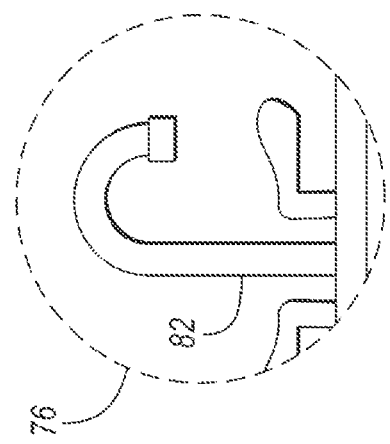
Figure 3C:
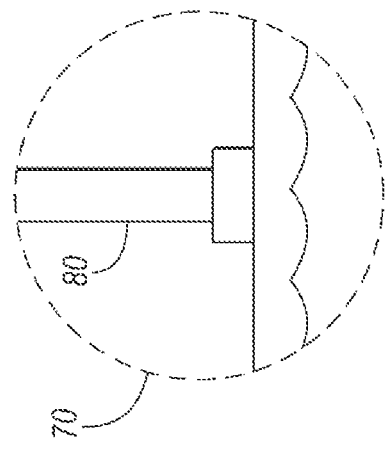
Figure 3E:
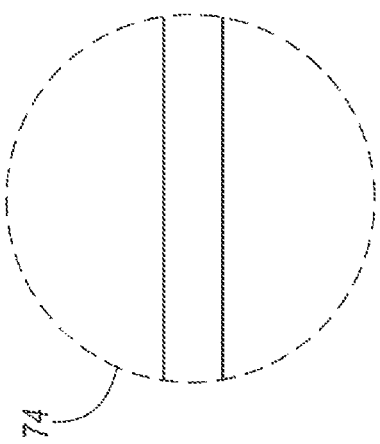

FIGS. 3A through 3E depict magnified, isolated views of regions 70, 72, 74, 76 and 78 of potable water delivery system 20 that may contribute to elevated lead in the potable water delivery system. Region 70 of FIG. 3A depicts goose neck pipe section 80 between water service line 40 and main water line 30. Goose neck pipe sections and pigtail pipes may be formed of lead. Therefore, such pipes are susceptible to lead dissolution. Region 72 of FIG. 3B depicts a portion of water service line 40 that runs from main water line 30 to the internal plumbing of house 32. A significant number of water service lines 40 are made from lead and can be a major source of lead contamination in water. Region 74 of FIG. 3C depicts a portion of water line 44. Water line 44 are commonly made of galvanized pipe. Lead particles can attach to the surface of galvanized pipes. Over time, the particles can enter potable drinking water, causing elevated lead levels. Region 76 of FIG. 3D shows fixture 82 configured to supply water to a sink in kitchen 36. Fixture 82 and other fixtures through house 32 may contain lead. Region 78 of FIG. 3E depicts copper pipe 84 including fittings 86 and 88. Fittings 86 and 88 may be attached to copper pipe 84 using lead solder. Solder made or installed before 1986 may contain high lead levels. As can be seen by the multiple regions within potable water delivery system that may contain lead, it is important to develop compositions that significantly reduce the dissolution of this lead into soluble lead ions that can have negative health effects on humans consuming the potable water.

In one or more embodiments, lead dissolution tests were performed to determine the efficacy of different compositions to control lead solubility. Untreated water from the mouth of the Detroit River, proximate to the Belle Isle intake, was used for the experiments. Tap water from Grosse Pointe Park, Michigan was also used to determine the efficacy of drinking water that was already treated with a phosphate composition. 1 L of untreated river water or tap water was placed in a non-reactive 1 L plastic container. 25 grams (g) of lead granules were weighed on a gram scale and placed in each plastic container. The lead granules contain 99.9984 weight % lead, 0.0010 weight % silver, 0.0001 weight % zinc, 0.0001 weight % tin, less than 0.0001 weight % copper, less than 0.0001 weight % bismuth, less than 0.0001 weight % nickel, less than 0.0001 weight % arsenic, and less than 0.0001 weight % antimony. The lead granules were sourced from Metal Shipper, Inc. of West Chester, Pennsylvania. In a first series of tests, 100 milligrams (mg), 250 milligrams and 500 milligrams of tartaric acid (A in the tables below), trisodium hydrogendicarbonate ($Na_3H(CO_3)_2$) (otherwise referred to as sodium sesquicarbonate) (B in the tables below), malic acid (C in the tables below), citric acid (D in the tables below), trisodium phosphate ($Na_3PO_4$) (E in the tables below) and succinic acid (F in the tables below) were weighed and then added to each lead granule water solution by stirring. After a seven (7) day residency time, the lead granules were removed from the water solution containing the tested lead anti-dissolution compounds in different concentrations. The lead granules were air dried in coffee filters and then weighed on a gram scale.

The results of the first series of tests are identified below. Experiment numbers 1-19 included the use of river water. Experiment number 20 included the use of tap water. Pb (A) refers to the weight of the lead after the seven (7) day experiment. Pb(C) refers to the weight difference in milligrams between the control experiment number 19 and the other experimental results. All values in Table 1 are in milligrams.

The pH of the control experiment number 19 was 7.2 with a general hardness (mg/L $CaCO_3$) of 100. Waters having a general hardness of less than or equal to 120 may be considered soft waters. Accordingly, the river water tested in the first series of experiments (and the second series of experiments below) are soft waters. Waters having a general hardness of greater than 120 may be considered hard waters. Hard waters are less corrosive to lead than soft waters. In low alkaline waters (e.g. a general hardness of 50), soluble lead concentration is highly sensitive to pH. In high alkaline waters (greater than 100 general hardness), the solubility of lead is insensitive to pH over a range of 6.5 to 8. The river water from the first and second series of experiments was 7.2 and 8.2 (see below), respectively. Accordingly, the solubility of lead was insensitive to pH for these values, thereby minimizing the effects of pH on the first and second series of experiments.

TABLE 1

| # | A | B | C | D | E | F | Pb(A) | Pb(C) |
|---|---|---|---|---|---|---|-------|-------|
| 1 | 100 | | | | | | 2,495 | −1 |
| 2 | 250 | | | | | | 2,497 | 1 |
| 3 | 500 | | | | | | 2,514 | 18 |
| 4 | | 100 | | | | | 2,500 | 4 |
| 5 | | 250 | | | | | 2,501 | 5 |
| 6 | | 500 | | | | | 2,513 | 17 |
| 7 | | | 100 | | | | 2,484 | −12 |
| 8 | | | 250 | | | | 2,485 | −11 |
| 9 | | | 500 | | | | 2,486 | −10 |
| 10 | | | | 100 | | | 2,501 | 5 |
| 11 | | | | 250 | | | 2,484 | −12 |
| 12 | | | | 500 | | | 2,510 | 14 |
| 13 | | | | | 100 | | 2,500 | 4 |
| 14 | | | | | 250 | | 2,508 | 12 |
| 15 | | | | | 500 | | 2,504 | 8 |
| 16 | | | | | | 100 | 2,498 | 2 |
| 17 | | | | | | 250 | 2,493 | −3 |
| 18 | | | | | | 500 | 2,507 | 11 |
| 19 | | | | | | | 2,496 | 0 |
| 20 | | | | | | | 2,500 | 4 |

The weight difference from the control (Pb(C)) was analyzed to determine potential compositions for further experimental testing. The higher concentrations of 250 mg and 500 mg showed a weight pickup in many of the test results. Also, visual inspection of the test results showed a residue of the compositions on the lead granules. For these reasons, in one or more embodiments, the proposed concentrations for the lead dissolution abatement compositions is less than 250 mg/L and in certain embodiments 100 mg/L or lower. Analysis of the experimental test results also indicated that malic acid dissolved the lead by 10 to 12 mg depending on concentration. The 100 mg concentrations of other compositions showed positive results. For instance, the test results for 100 mg of citric acid and 100 mg of trisodium phosphate were very similar to the performance of tap water. This demonstrates that the experimental set up and analysis was sound because previous proposals show that citric acid and trisodium phosphate reduce lead dissolution. However, the previous proposals did not show that succinic acid and trisodium hydrogendicarbonate can achieve similar results, as shown in the test results of experiment numbers 4 and 16.

Based on the first series of experiments, a second series of experiments were run using the compounds from the first series of experiments (except for malic acid) blended together at different or the same weights to determine potential synergy between the different compounds. The concentrations of the blends were at the lower levels (e.g. about 100 milligrams) that showed positive results in the first series of experiments. Experiment numbers 21-51 included the use of river water. Experimental number 52 included the use of tap water. All values in Table 2 are in milligrams. The pH of the control experiment number 51 was 8.1 with a general hardness (mg/L $CaCO_3$) of 100.

TABLE 2

| #  | A  | B  | C  | D  | E  | F  | Pb(A) | Pb(C) |
|----|----|----|----|----|----|----|-------|-------|
| 21 | 60 | 60 |    |    |    |    | 2,482 | −5    |
| 22 | 60 |    |    | 60 |    |    | 2,478 | −9    |
| 23 | 60 |    |    |    | 60 |    | 2,481 | −6    |
| 24 | 60 |    |    |    |    | 60 | 2,502 | 15    |
| 25 |    | 60 | 60 |    |    |    | 2,496 | 9     |
| 26 |    | 60 |    | 60 |    |    | 2,491 | 4     |
| 27 |    | 60 |    |    |    | 60 | 2,500 | 13    |
| 28 |    |    |    | 60 | 60 |    | 2,497 | 10    |
| 29 |    |    |    | 60 |    | 60 | 2,494 | 7     |
| 30 |    |    |    |    | 60 | 60 | 2,480 | −7    |
| 31 | 80 | 40 |    |    |    |    | 2,492 | 5     |
| 32 | 80 |    |    | 40 |    |    | 2,487 | 11    |
| 33 | 80 |    |    |    | 40 |    | 2,504 | 17    |
| 34 | 80 |    |    |    |    | 40 | 2,497 | 10    |
| 35 |    | 80 | 40 |    |    |    | 2,482 | −5    |
| 36 |    | 80 |    |    | 40 |    | 2,486 | −1    |
| 37 |    | 80 |    |    |    | 40 | 2,500 | 13    |
| 38 |    |    | 80 | 40 |    |    | 2,500 | 13    |
| 39 |    |    | 80 |    | 40 |    | 2,484 | −3    |
| 40 |    |    |    | 80 | 40 |    | 2,488 | 1     |
| 41 | 40 | 40 | 40 |    |    |    | 2,496 | 9     |
| 42 | 40 | 40 |    | 40 |    |    | 2,487 | 0     |
| 43 | 40 | 40 |    |    |    | 40 | 2,486 | −1    |
| 44 | 40 |    |    | 40 | 40 |    | 2,498 | 11    |
| 45 | 40 |    |    | 40 |    | 40 | 2,500 | 13    |
| 46 | 40 |    |    |    | 40 | 40 | 2,494 | 7     |
| 47 |    | 40 | 40 | 40 |    |    | 2,487 | 0     |
| 48 |    | 40 | 40 |    |    | 40 | 2,492 | 5     |
| 49 |    | 40 |    |    | 40 | 40 | 2,495 | 8     |
| 50 |    |    |    | 40 | 40 | 40 | 2,483 | −4    |
| 51 |    |    |    |    |    |    | 2,487 | 0     |
| 52 |    |    |    |    |    |    | 2,505 | 18    |

As can be seen from the second series of experiments, the specific blends of compounds generate different results. Some of the results show that more lead is dissolved than the control experiment number 51. These experiments have a significant negative value in the Pb(C) column. Experiment numbers 30, 35 and 50 are in this category. In experiment number 30, equal amounts of trisodium phosphate and succinic acid appear to dissolve lead. In experiment number 35, 2 parts trisodium hydrogendicarbonate to 1 part citric acid appear to dissolve lead. In experiment number 50, equal parts citric acid, trisodium phosphate and succinic acid appear to dissolve lead. These experiments indicate that succinic acid and trisodium phosphate at the concentrations tested may not form a beneficial mixture for lead dissolution. Also, an overwhelming amount of trisodium hydrogendicarbonate to citric acid may not have a net positive effect on reducing lead dissolution.

Several of the specific combinations are superior to the control experiment. Experiment numbers 24, 27, 37, 38 and 45 reduce lead dissolution by at least 13 mg compared to the control experiment. Four (4) out of five (5) of these experiments include succinic acid. Experiment number 24 has the best results. Experiment number 24 uses half succinic acid and half tartaric acid. There are also two good results (i.e. experiments number 27 and 37) with trisodium hydrogendicarbonate and succinic acid. Therefore, the experimental data shows that succinic acid (e.g. trisodium hydrogendicarbonate and/or tartaric acid), used in combination with other compounds, provides a synergist effect of reducing lead dissolution.

Succinic acid also has health benefits other than reducing lead dissolution. Succinic acid has anti-inflammatory and analgesic properties. Succinic acid is helpful in managing pain associated with arthritis. The introduction of succinic acid in lead dissolution control compositions may help individuals with this medical condition to reduce inflammation and their pain levels.

Tartaric acid possesses strong anti-inflammatory and antioxidant properties. Therefore, the introduction of succinic acid in lead dissolution control compositions may help individuals suffering from joint inflammation. Other organic acids, such as lactic acid, phytic acid, mandelic acid, glycolic acid and citric acid may be used to provide the dual functionality of anti-inflammatory and as a material in a lead anti-dissolution composition. Phytic acid inhibits the absorption of iron, zinc and calcium. While this attribute of phytic acid may be disadvantageous for nutritional purposes, using low doses in a lead anti-dissolution composition is beneficial in one or more embodiments.

In one embodiment, the lead dissolution control composition includes a first organic acid and a second organic acid. The first organic acid may be selected from the group of succinic acid, tartaric acid and citric acid. The second organic acid may be selected from the same group. The weight ratio of the first organic acid to the second organic acid may be any of the following ratios or in a range of any two of the following ratios: 1:4, 2:3 and 1:1. In one or more embodiments, the lead dissolution control composition of first and second organic acids does not include any phosphates. As shown above, a combination of two organic acids successfully abated lead dissolution. Such formulations reduce lead dissolution while providing anti-inflammatory properties without using phosphates, which may have a negative effect on the environment.

In one or more embodiments, the lead dissolution control composition including first and second organic acids may optionally include one or more phosphate substitutes (e.g. trisodium hydrogendicarbonate) and/or one or more phosphate compounds (e.g. trisodium phosphate) in a relatively low concentration. Other non-limiting examples of phosphate substitutes include sodium aluminum silicate, dried plum extracts and rice starches. Other non-limiting examples of phosphate compounds include monosodium phosphate, sodium hexametaphosphate, tripotassium phosphate, monopotassium phosphate and potassium hexametaphosphate. In such embodiments, the amount of trisodium hydrogendicarbonate and/or one or more phosphate compounds to the first and second organic acids may be any of the following ratios or in a range of any two of the following ratios: 1:7, 1:6, 1:5 and 1:4. The amount of trisodium hydrogendicarbonate to the one or more phosphate compounds may be any of the following ratios or in a range of any two of the following ratios: 1:1, 2:1, 3:1 and 4:1. In these embodiments, the compositions are predominantly organic acids while including some phosphate to impart beneficial anti-dissolution characteristics while not contributing greatly to the phosphate footprint in the environment.

The lead dissolution control compounds may be mixed with a relatively small amount of water. In one embodiment, the lead dissolution control compound may be mixed with two parts water to one part lead dissolution compound. In other embodiments, the amount of lead dissolution control compound in the concentrated water solution is any of the following values or in a range of any two of the following values: 30, 31, 32, 33, 34, 35, 36, 37, 38, 39 and 40 weight percent. The concentrated lead dissolution control solution may be applied to a large volume of untreated drinking water. The amount of concentrated lead dissolution control solution in untreated drinking water may be any of the following values or in a range of any two of the following values: 5, 6, 7, 8, 9, 10, 15, 20, 25, 26, 27, 28, 29 and 30 mg/L of untreated drinking water.

The concentrated lead dissolution control solution may be applied at different points in potable water distribution system 20. The concentrated lead dissolution control solution may be applied to the untreated water in basin 24. The concentrated lead dissolution control solution may be applied to the water in water treatment plant 26 after it has been treated for other purposes. In one embodiment, the concentrated lead dissolution control solution is applied at both basin 24 and the water treatment plant 26 after treatment for other purposes. In such embodiment, half of the concentrated lead dissolution control solution is applied in the first application and half of the concentrated lead dissolution control solution is applied in the second application. Each of the applications may also be of a different composition. For instance, the first composition may only include succinic and tartaric acid and the second composition may include trisodium hydrogendicarbonate and trisodium phosphate. The first application may include the first or second composition and the second application may include the other composition.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A multi-functional lead anti-dissolution composition comprising:
    a first organic acid, the first organic acid is selected from the group consisting of: a succinic acid, a tartaric acid and a citric acid;
    a second organic acid, the second organic acid is selected from the group consisting of: a succinic acid, a tartaric acid and a citric acid, the first organic acid being different than the second organic acid;
    a third organic acid, the third organic acid is selected from the group consisting of: a lactic acid, a phytic acid, a mandelic acid, and a glycolic acid, the third organic acid is present in a weight percent of 5 to 10 percent by weight; and
    a blend of a phosphate substitute compound and a phosphate compound, the phosphate substitute compound is selected from the group consisting of trisodium hydrogendicarbonate, sodium aluminum silicate, dried plum extract, rice starch, and a combination thereof.

2. The multi-functional lead anti-dissolution composition of claim 1, wherein the first and second organic acids are cumulatively present in a weight percent of 60 to 95 percent by weight.

3. The multi-functional lead anti-dissolution composition of claim 1, wherein the third organic acid is the phytic acid.

4. The multi-functional lead anti-dissolution composition of claim 1, wherein the phosphate substitute compound is the trisodium hydrogendicarbonate.

5. The multi-functional lead anti-dissolution composition of claim 1, wherein the phosphate substitute compound is the sodium aluminum silicate.

6. The multi-functional lead anti-dissolution composition of claim 1, wherein the phosphate substitute compound is the dried plum extract.

7. The multi-functional lead anti-dissolution composition of claim 1, wherein the phosphate substitute compound is the rice starch.

8. The multi-functional lead anti-dissolution composition of claim 1, wherein the phosphate compound is selected from the group consisting of monosodium phosphate, sodium hexametaphosphate, tripotassium phosphate, monopotassium phosphate and potassium hexametaphosphate.

* * * * *